United States Patent [19]
McClintic

[11] Patent Number: 5,685,718
[45] Date of Patent: Nov. 11, 1997

[54] MOTION SIMULATOR

[75] Inventor: Frank J. McClintic, Toms River, N.J.

[73] Assignee: MaxFlight Corporation, Lakewood, N.J.

[21] Appl. No.: 383,992

[22] Filed: Feb. 6, 1995

[51] Int. Cl.$^6$ .................................................. G09B 9/08
[52] U.S. Cl. .................................. 434/38; 434/30; 434/55
[58] Field of Search ............................ 434/29, 30, 38, 434/43, 47, 55, 59, 58; 472/44, 45, 28, 130

[56] References Cited

U.S. PATENT DOCUMENTS

| | | | |
|---|---|---|---|
| 1,987,004 | 1/1935 | Eyerly | 472/44 |
| 4,019,261 | 4/1977 | Pancoe | 434/58 |
| 4,710,128 | 12/1987 | Wachsmuth et al. | 434/46 |
| 4,710,129 | 12/1987 | Newman | 434/55 |
| 4,856,771 | 8/1989 | Nelson et al. | 434/55 |
| 5,021,982 | 6/1991 | Crosbie et al. | 364/578 |
| 5,051,094 | 9/1991 | Richter et al. | 434/30 |
| 5,308,022 | 5/1994 | Cronkheit et al. | 244/3.14 |
| 5,320,538 | 6/1994 | Baum | 434/307 |
| 5,322,441 | 6/1994 | Lewis et al. | 434/307 |
| 5,388,991 | 2/1995 | Morris | 434/55 |
| 5,431,569 | 7/1995 | Simpkins et al. | 434/29 |
| 5,453,011 | 9/1995 | Feuer et al. | 434/30 X |

FOREIGN PATENT DOCUMENTS

| | | | |
|---|---|---|---|
| 1142342 | 2/1969 | United Kingdom | 472/28 |

*Primary Examiner*—Jeffrey A. Smith

[57] ABSTRACT

A flight simulator wherein the pitch, roll and yaw axes are separated from the trainee to provide a more realistic simulated flight experience in that the trainee feels a translation as well as a rotation of his body as he performs a simulated climb, turn, or roll.

45 Claims, 3 Drawing Sheets

MOTION SIMULATOR

BACKGROUND OF THE INVENTION

1. Field of the Invention

This invention relates to a flight simulator, and in particular to one which provides a more realistic experience concerning the effects of simulator motion upon the person who operates the flight controls.

2. Description of Related Art

Flight simulators enhance safety and reduce the costs of training for real flight. The safety aspects are enhanced where raw trainees are instructed to fly, or where experienced pilots are instructed on procedures covering new aircraft or new airport situations. The cost is reduced where pilots maintain skills for commercial flying, or for practice in combat or exhibition operations. Fuel bills, landing fees and maintenance costs are avoided by using a simulator rather than actual flight time.

The general characteristics of a simulator are that a trainee is placed before controls and instruments which duplicate an actual aircraft. The canopy surrounding the trainee may be blank or it may have a screen upon which images are projected to further simulate responses to the movement of the controls. The trainee's seat is also caused to move in response to his actions upon the controls.

A problem with existing simulators is that the trainee's center of gravity is at the intersection of axes which define the attitude of the simulator with respect to pitch (up and down to the trainee), roll (rotation about the axis of travel), and yaw (left or right to the direction of travel). The result is that when the controls are moved to cause a climb, the trainee is rotated about his center of gravity (his pelvis) whereby his feet rotate forward and his head rotates backwards.

In actual flight a pilot is not at the center of gravity of the aircraft, but is usually located forward of it. When the pilot moves the controls for a maneuver, he feels an acceleration as the seat both translates and rotates him. This dual effect upon the trainee is not fully provided in the art of flight simulators.

For example, U.S. Pat. No. 4,710,128 to Wachsmuth et al. discloses a cockpit which is gimbaled on three independently-controlled axes, i.e., pitch, roll, and yaw, all of which revolve about a planetary axis. The cockpit is swung around the planetary axis by an arm so as to exert centripetal forces in the order of 2 g's upon the pilot. The pilot controls each of the gimbaled axes with an on-board computer while being subjected to disorienting forces which are controlled by a stationary computer.

U.S. Pat. No. 4,856,771 to Nelson et al. discloses a video simulator machine having an enclosed spherical cockpit which can rotate 360 degrees in any direction, thus simulating simultaneous movements of pitch, roll, and yaw as the occupants of the cockpit control a joystick. When he pulls the joystick back to simulate a climb his body rotates downward. A separate lift control assembly described as a rack and pinion moves a stationary base which supports the rotating sphere and it is controlled by buttons from the cockpit or by a computer. This lifting assembly is limited in its travel and in its speed.

U.S. Pat. No. 4,710,129 to Newman et al. discloses a cabin mounted between the arms of a yoke which define a horizontal axis (pitch), the yoke being rotatably mounted about vertical axis (yaw) to a stationary base. A limited translatory movement on the base, more especially in the vertical direction, may also be provided.

U.S. Pat. No. 5,051,094 to Richter et al. discloses a g-force trainer in which a pilot is enclosed in a gondola which is swung by an arm around a vertical axis. A counterweight is mounted to the end of the arm for dynamic balance, and the gondola is free to swing about a roll axis, supported by the arm, at the pilot's eye level as the speed increases.

Accordingly, there is a need in the art for a flight simulator which more closely replicates the actual movement felt by a pilot in maneuvering an aircraft. In particular, to simulate a vertical and sideways forces upon the pilot which are proportional to the severity of a maneuver he directs on the controls. These forces being in addition to the rotation in place provided by other flight simulators.

SUMMARY OF THE INVENTION

The present invention relates to a more realistic motion simulator wherein the participant is not located near the intersection of pitch, roll and yaw axes.

In one embodiment of the invention, a pitch boom is driven to rotate about a pitch axis, and a swing boom, lying along a roll axis which is perpendicular to the pitch axis, supports a participant compartment. The participant compartment can rotate about the roll axis, and its center of gravity, is separated from the intersection of the pitch and roll axes.

In a further embodiment of the invention, a counterweight is added to the side of the swing boom which is opposite to the participant compartment. A sensor determines an out-of-balance condition after the participant enters the participant compartment. A balance control system operates upon a signal from the sensor to statically balance the motion simulator by directing a drive motor to move the counterweight to minimize the torque about the pitch axis caused by the weight of all the components supported by it. The process is repeated during motion simulation to achieve dynamic balance. This process provides the same response time for a dive or a climb maneuver, as would be felt in an actual aircraft.

In another embodiment of the invention, a platform driven by a yaw motor supports the motion simulator described above, the platform being rotatable about a yaw axis which intersects the pitch and roll axes of the previous embodiment. The participant is separated from this intersection, so three directions of translation and three directions of rotation are experienced by the participant as the motion simulator responds to the controls.

In still another embodiment of the invention, the motion simulator may be raised and lowered to permit easy entry and egress of the participant from the motion simulator.

In the foregoing embodiments of the invention, a control system operates under the direction of a flight algorithm which can replicate the flight conditions of various aircraft, combat or stunt routines, or various airport landing and takeoff situations. The control system is linked to controls in the cockpit (participant compartment) and to various display devices therein which may include indicators, display panels, or helmet mounted displays.

These and other features and advantages of the invention will be better understood with consideration of the following detailed description of the preferred embodiments taken in conjunction with the accompanying drawings.

The drawings are not to scale.

DETAILED DESCRIPTION OF THE PREFERRED EMBODIMENTS

Figure 1A:
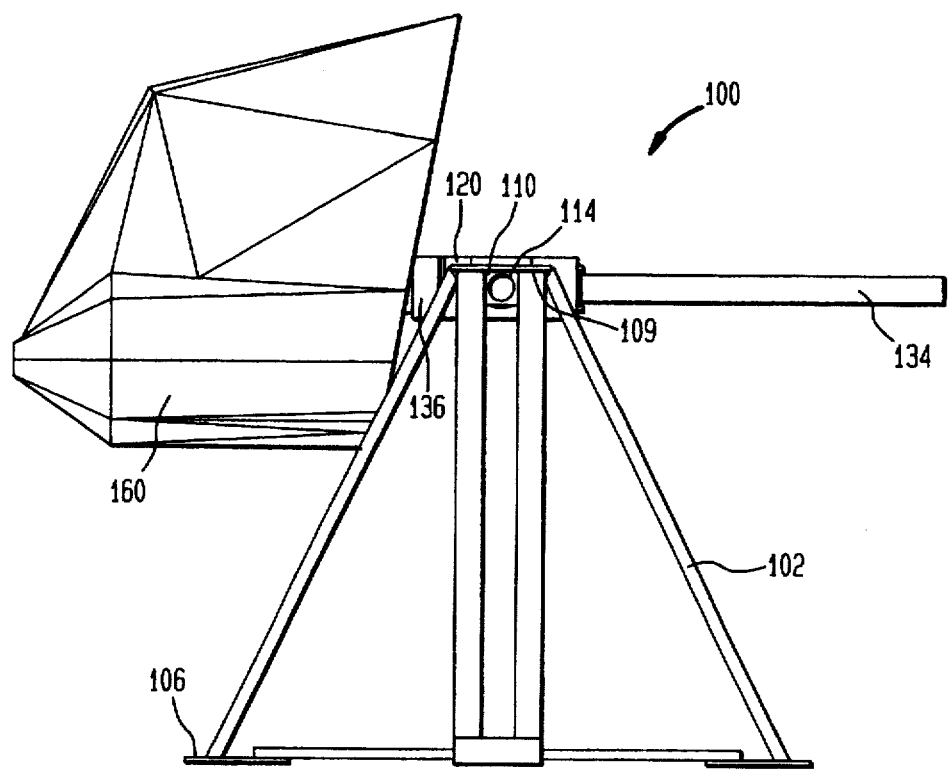
FIGS. 1A, 1B, and 1C are side, front and top views, respectively, of one embodiment of the invention.
Figure 1B:
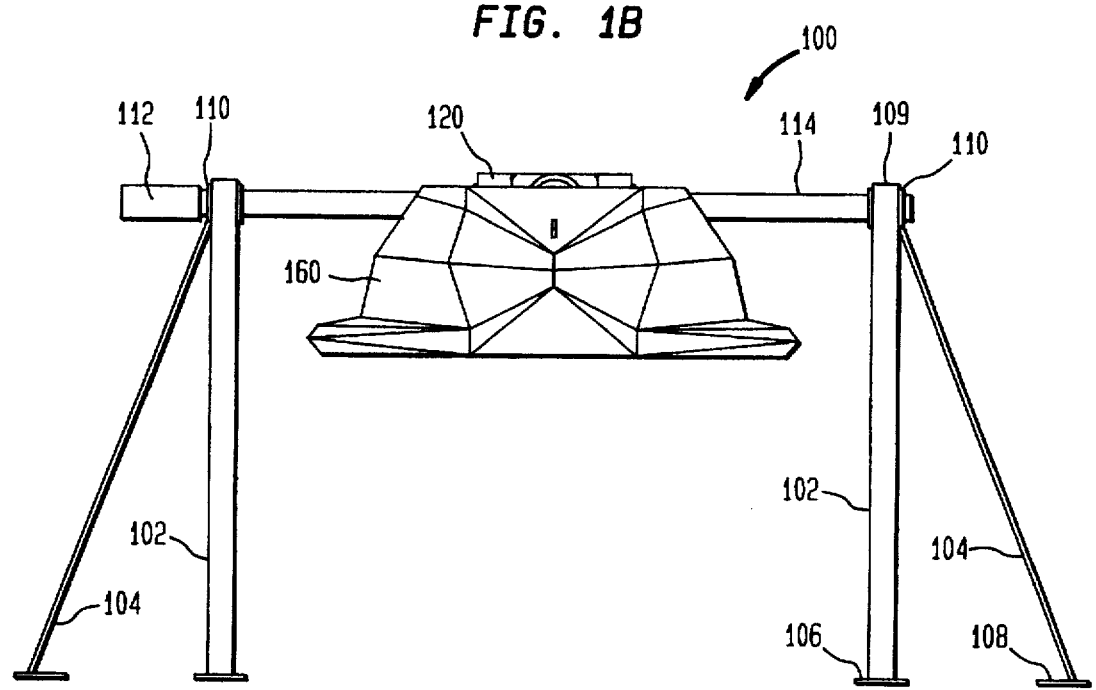
Figure 1C:
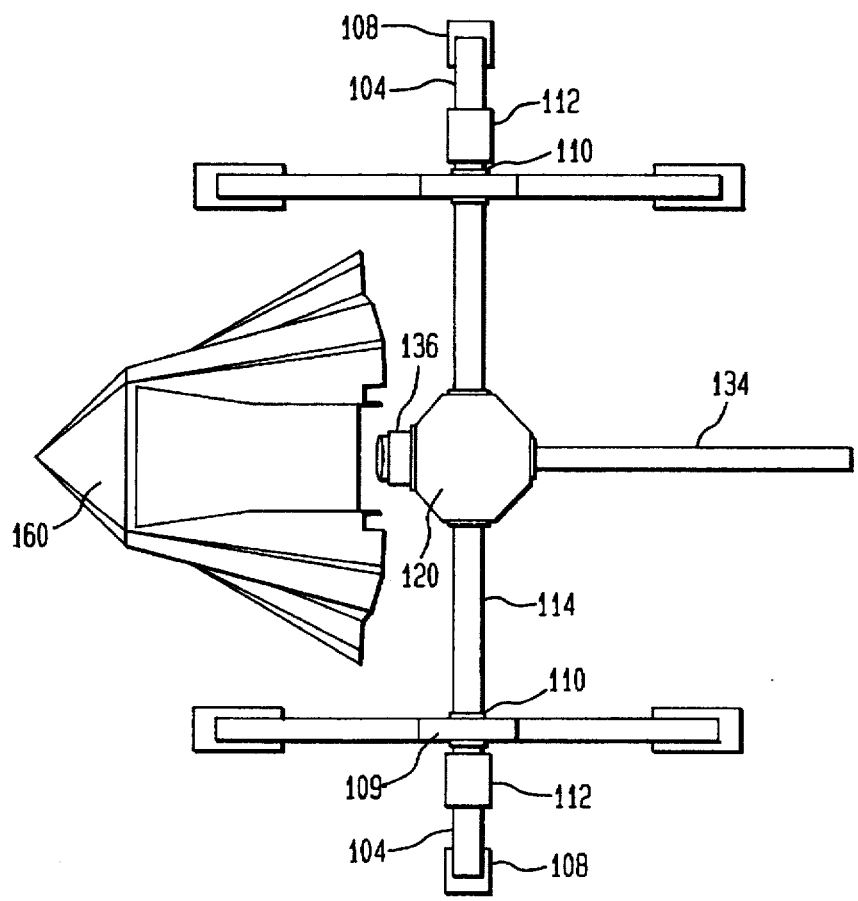

Referring now to FIGS. 1A, 1B, and 1C, there is shown apparatus 100 in accordance with one embodiment of the invention. Like elements bear the same reference numbers in all the drawings which follow.

Means for support is comprised of support frames 102 and side frames 104 which rest upon plates 106 and 108, respectively. The support frames and side frames terminate at and support pedestals 109. The pedestals and their associated support means are spaced apart and in turn support two pitch bearings 110 which provide a rotating support to pitch boom 114, which lies along a pitch axis. One of the pedestals also supports a pitch motor 112, which is adapted to drive the pitch boom bi-directionally around the pitch axis. The pitch motor may be driven electrically or hydraulically under manual or computer control in any manner known in the art. Means for braking (not shown) may also be connected between the pitch boom and a pedestal, pitch motor, or support means. Braking means are well known in the art and may also be under manual or computer control.

Pitch boom 114 supports hub 120 which supports swing boom 134 such that the swing boom which lies along a roll axis, is perpendicular to the pitch boom and pitch axis. The hub rotates with the pitch boom and contains a roll motor (not shown) and roll bearing (not shown) which permits the swing boom to be rotated about the roll axis by the roll motor. The discussion above regarding the type, operation, control, and breaking of the pitch motor apply here to the roll motor.

One end 136 of the swing boom supports cockpit assembly 160. The cockpit assembly may comprise: a seat for a trainee, input controls such as a joystick, a wheel, buttons, switches, levers and the like, instruments which indicate various flight conditions such as cockpit attitude, speed and acceleration, reserves of fuel and armaments, condition of flight control surfaces, and means for displaying what a trainee would see in actual flight. These displays may be on a video screen, a projected screen, or a helmet mounted display. The cockpit assembly also contains communication means through which power, flight information, and control requests from the trainee are passed between control systems which may be in the cockpit, or on a fixed reference, or both. The communication means may comprise cables and slip rings, or a telemetry system. Power may be provided through the slip rings or may be stored in the cockpit in batteries.

In operation, it is important to note that while the roll axis passes through the cockpit, the pitch axis does not. By placing the trainee away from the pitch axis, the trainee will experience a lifting sensation, as well as a rotating sensation, when the input controls call for a climb. This satisfies a need in the art for a flight simulator which more closely replicates the actual movement felt by a pilot in maneuvering an aircraft. The cockpit assembly will swing clockwise in FIG. 1A as long as the pilot indicates a climb. Pedestals 109 are spaced above plates 106 and 108 so that the cockpit and swing boom may completely rotate about the pitch axis to simulate a loop in actual flight.

The rate at which the simulated loop is performed is determined by the position of the input controls and an algorithm which is stored in the control system. This algorithm can replicate actual flight conditions of various aircraft, flight situations such as malfunctions, combat, takeoff, landing and the like. The output of the control system drives the pitch and roll motors and it also drives all the instruments and display systems in the cockpit. For training, or for entertainment, the control system may record the simulated flight performance of a trainee and display this information on a screen or direct it to a memory or a printer.

When the trainee calls for a roll, an input signal is sent to the control system which processes it according to an algorithm, as above, so that the roll motor drives the cockpit assembly in a circular motion about the roll axis until the input controls are returned to a neutral position. The support means are spaced apart sufficiently to permit complete rotation of the cockpit assembly about the roll axis.

Figure 2:
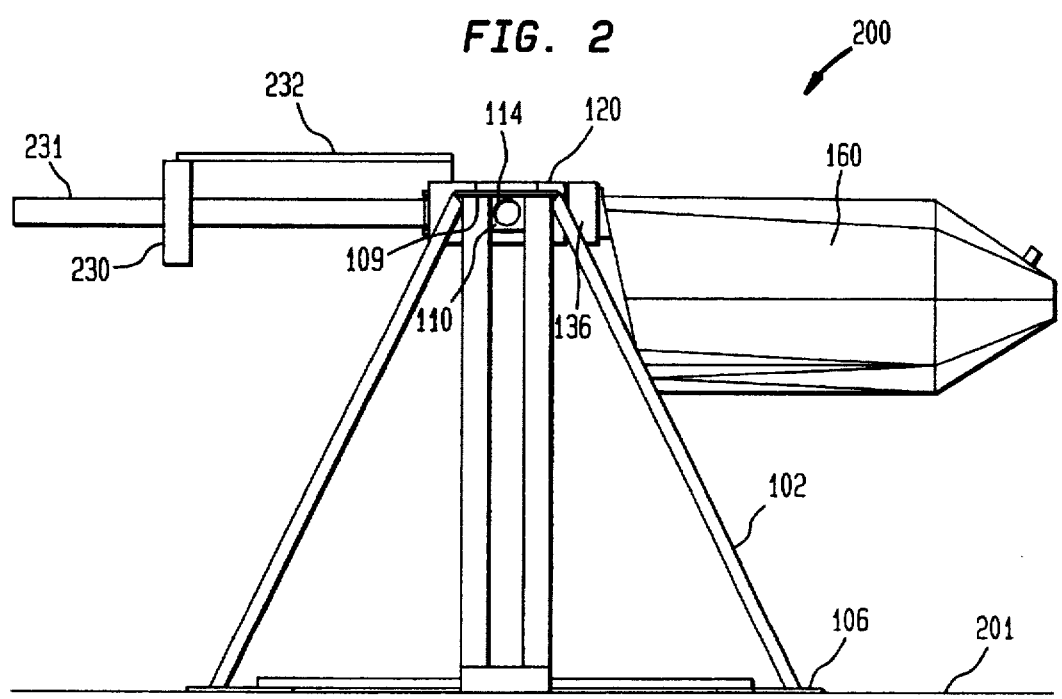
FIG. 2 is a side view of a further embodiment of the invention.

Referring now to FIG. 2, there is shown apparatus 200 in accordance with another embodiment of the invention wherein elements beginning with a "1" are the same elements, operating in the same way, as in apparatus 100.

Apparatus 200 rests upon fixed reference 201 and elements which are added in FIG. 2 are counterweight 230 which is slidably connected to move along a second section of swing boom 231. A first section 136 of the swing boom supports the cockpit assembly. Counterweight drive assembly 232 is interspersed between the counterweight and the pitch boom, so that a first portion of it is fixed to the center weldment and a second portion is attached to the counterweight, a counterweight motor (not shown) in hub 120, being adapted to move the second portion of the counterweight drive assembly. In operation, pitch motor 112 is left in a neutral position as the trainee is seated in the cockpit and before the flight simulation begins. In this condition the cockpit assembly will rotate about the pitch axis in a direction determined by the centers of gravity of all the elements supported by the swing boom and the distances of these centers of gravity from the pitch axis. These distances are moment arms, and when multiplied by the weight of each element supported by the swing boom (including the swing boom itself) they each produce a moment measured in foot pounds, the sum of which produces a net torque about the pitch axis which will cause the cockpit to point straight up or down. This is a condition of static imbalance, which is detected by a sensor coupled to the pitch boom. The sensor develops a signal which is fed into a balance control system which directs the counterweight motor to move the counterweight to minimize the net torque about the pitch axis. This operation brings the apparatus into a condition of static balance and compensates for the various weights of trainees. A further adjustment is performed to achieve a condition of dynamic balance during flight simulation. Dynamic balancing is well known in the art and the benefit achieved is to have the same response time for a climb command as for a dive command.

Figure 3:
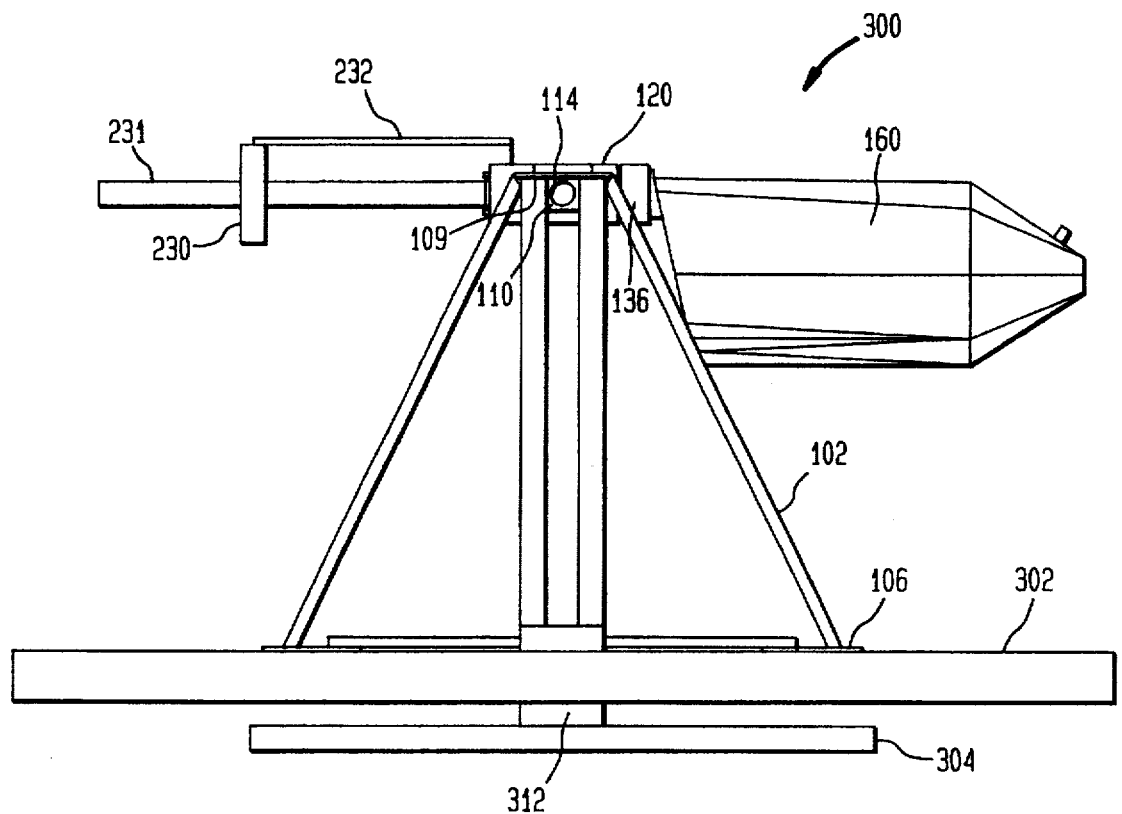
FIG. 3 is a side view of another embodiment of the invention.

Referring now to FIG. 3, there is shown apparatus 300 in accordance with yet another embodiment of the invention Plates 106 and 108 rest upon platform 302 which is free to rotate about an axis which intersects the pitch and the roll axes at the center of hub 120. The three axes form an orthogonal set of axes, rotation about which will define any attitude of cockpit assembly 160 in pitch, roll, and yaw directions, as one would experience in real flight situations. The intersection of these axes is not located in the cockpit assembly, as is common in most flight simulators, but is located behind the trainee as it would be in real flight where the pitch axis would be near the intersection of the wings and the fuselage. In this configuration, the trainee feels an acceleration in pitch and yaw as the controls are moved together with a rotation in angular position which is provided by other simulators. Base 304 supports yaw motor 312 which drives platform 302 about the yaw axis, YY. The discussion above regarding the type, operation, control, and breaking of the pitch motor apply here to the yaw motor. When the trainee calls for a turn, an input signal is sent to the control system which processes it according to an algorithm, as above, so that the yaw motor drives the platform in a circular motion about the yaw axis until the input controls are returned to a neutral position. All the other elements and their functions were described previously.

Figure 4:
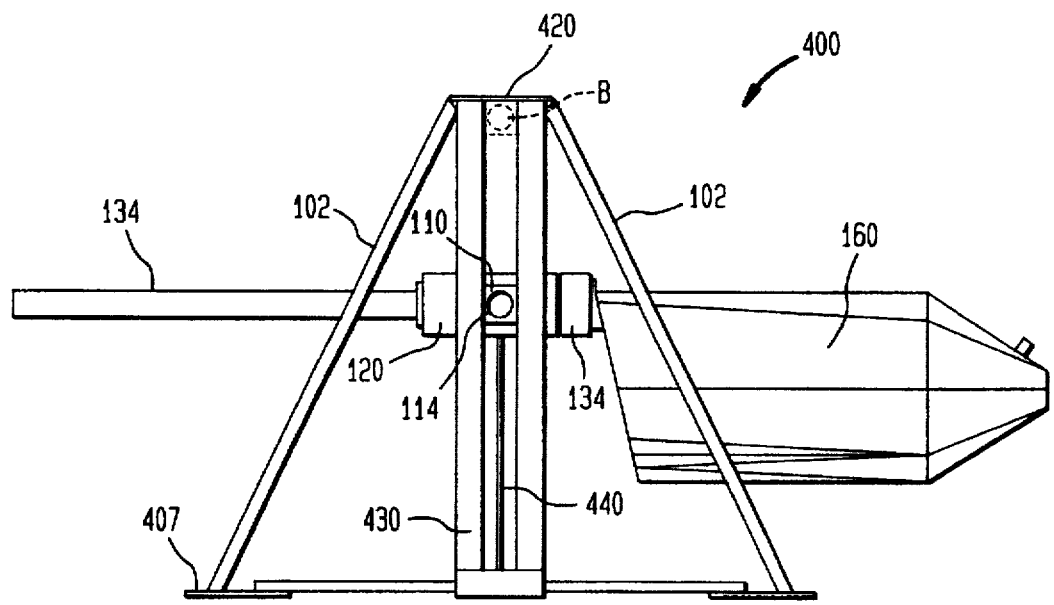
FIG. 4 is a side view of still another embodiment of the invention.

Referring now to FIG. 4, there is shown apparatus 400 which is in accordance with still another embodiment of the invention wherein base plate 407 is attached to support frames 102 which terminate in cap 420. Hydraulic ram 440 is shown in a lowered position in which it supports pitch boom 114, and in turn, hub 120, swing boom 134, and cockpit assembly 160, the functions of which were described for apparatus 100. The purpose of the hydraulic ram 440 is to make entry into the cockpit assembly 160 easier for a trainee. After the trainee is seated the hydraulic ram is guided by track 430 and elevated so that pitch boom 114 and pitch bearing 110 are shown (dotted) at position "B". In this position, the cockpit assembly is completely rotatable about the pitch axis and it operates as described in the discussion of apparatus 100 or apparatus 200. The hydraulic ram is the preferred embodiment, but its function could be performed by a scissored arrangement which permits lowering of the pitch boom or by any other lift means such as a screw drive, rack and pinion, winch, or an electrically driven mechanism.

In a preferred embodiment the pitch, roll, and yaw motors are hydraulically driven and are provided by Rineer Hydraulics, Inc., San Antonio, Tex. The slip rings which communicate power and signals between the cockpit assembly and the computer are provided by Hydromotion Inc, Spring City, Pa. The computer which is outside the cockpit may be provided by any vendor using an Intel, Inc. 486 DX2-66 processor. The on-board computer uses one 486 DX2-66 processor, and two image generators from Tellurian, Inc., Alendale, N.J. The dimensions of the simulator fit within a cube which is 12 feet on a side and can be expanded to larger dimensions.

This satisfies the need of present flight simulators by providing translational as well as rotational movement in six degrees of freedom to a trainee.

Changes and modifications in the specifically described embodiments can be carried out without departing from the scope of the invention. In particular, the means for support may have any configuration which supports the intersection of three axes of rotation and which permits the cockpit, which is separated from that intersection, to swing in three directions.

I claim:

1. A motion simulator comprising:
   means for support:
   a pitch boom, having a pitch axis, the pitch boom being rotatably connected to the support means;
   a swing boom, having a first end and a second end, the swing boom extending along a roll axis in between said first end and said second end that is perpendicular to the pitch axis, wherein the swing boom is rotatably connected to the pitch boom in a manner that enables the swing boom to completely rotate about the pitch boom in a plane perpendicular to the pitch axis, and wherein the swing boom is rotatable about the roll axis; and
   a participant compartment, having a center of gravity, coupled to said first end of the swing boom;
   whereby the participant compartment's center of gravity is separated from the pitch axis.

2. The motion simulator of claim 1 wherein the pitch boom is supported by the support means at a height that is sufficient to permit the swing boom and the participant compartment to rotate about the pitch axis.

3. A motion simulator comprising:
   means for support:
   a pitch boom, having a pitch axis, the pitch boom being rotatably connected to the support means;
   a swing boom, having a first end and a second end, the swing boom extending along a roll axis in between said first end and said second end that is perpendicular to the pitch axis, the swing boom being rotatably connected to the pitch boom;
   a pitch motor for selectively rotating the swing boom about the pitch axis, wherein the pitch boom is supported by the support means at a height that is sufficient to permit the swing boom to completely rotate about the pitch boom in a plane perpendicular to the pitch axis; and
   a participant compartment, having a center of gravity, coupled to said first end of the swing boom;
   whereby the participant compartment's center of gravity is separated from the pitch axis.

4. The motion simulator of claim 3 further comprising a roll motor for selectively rotating the swing boom about the roll axis.

5. The motion simulator of claim 3 wherein the participant compartment further comprises input controls located in the participant compartment upon which a participant enters directions.

6. The motion simulator of claim 3 further comprising:
   a control system; and
   drive motors controlled by said control system, wherein said drive motors adjust the orientation of the swing boom and the participant compartment.

7. The motion simulator of claim 6 wherein the control system operates under the direction of a flight algorithm which replicates the performance of an aircraft.

8. The motion simulator of claim 7 wherein the control system drives indicators in the participant compartment.

9. The motion simulator of claim 7 wherein the control system drives a screen display in the participant compartment.

10. The motion simulator of claim 7 wherein the control system drives a helmet mounted display.

11. The motion simulator of claim 7 wherein the control system records the performance of a person simulating flight conditions in the aircraft.

12. A flight simulator comprising:
    means for support;
    a pitch boom, having a pitch axis, being rotatably connected to the support means;
    a swing boom, comprising a first section and a second section which are able to rotate about the pitch axis, having a roll axis which is perpendicular to the pitch axis, being rotatably connected to the pitch boom;
    a counterweight being slidably connected to move along the second section of the swing boom; and a cockpit assembly, having a center of gravity, being supported by the first section of the swing boom;

whereby the cockpit assembly's center of gravity is separated from the pitch axis.

13. The flight simulator of claim 12 further comprising a counterweight drive assembly, a first portion of which being fixed to the pitch boom and a second portion of which being attached to the counterweight, being adapted to move the counterweight along the second section of the swing boom.

14. The flight simulator of claim 13 wherein the drive assembly further comprises a counterweight motor being adapted to move the second portion of the counterweight drive assembly.

15. The flight simulator of claim 12 further comprising a sensor being coupled to the pitch boom and adapted to detect the rotation of the pitch boom and to generate a signal which is proportional to that rotation.

16. The flight simulator of claim 15 further comprising a balance control system being adapted to receive the signal from the sensor, operate upon it, and direct the counterweight drive motor to statically balance the flight simulator about the pitch axis.

17. The flight simulator of claim 16 wherein the balance control system directs the counterweight drive motor to dynamically balance the flight simulator about the pitch axis.

18. The flight simulator of claim 15 wherein the sensor is optically coupled to the pitch boom.

19. The flight simulator of claim 15 wherein the sensor is mechanically coupled to the pitch boom.

20. The flight simulator of claim 12 wherein the support means comprise:

a base resting upon a fixed reference;

a support frame attached to the base; and a pedestal being attached to the support frame;

whereby the pitch axis is elevated above the base by a distance which is sufficient to permit the cockpit assembly to rotate about the pitch axis.

21. The flight simulator of claim 12 further comprising a pitch motor having a frame and a shaft whereby the shaft drives the pitch boom in a rotating motion about the pitch axis and the frame is attached to the support means.

22. The flight simulator of claim 12 further comprising a roll motor having a frame and a shaft whereby the frame is fixed to the pitch boom and the shaft drives the swing boom in a rotating motion about the roll axis.

23. The flight simulator of claim 12 wherein the cockpit assembly further comprises input controls located in the cockpit upon which a trainee enters directions.

24. The flight simulator of claim 12 further comprising:

a control system; and drive motors controlled by said control system, wherein said drive motors adjust the orientation of the swing boom and the cockpit assembly.

25. The flight simulator of claim 24 wherein the control system operates under the direction of a flight algorithm which replicates the performance of an aircraft.

26. The flight simulator of claim 24 wherein the control system drives indicators in the cockpit.

27. The flight simulator of claim 24 wherein the control system drives a screen display in the cockpit.

28. The flight simulator of claim 24 wherein the control system drives a helmet mounted display.

29. The flight simulator of claim 24 wherein the control system records the performance of a person simulating flight conditions in the cockpit.

30. The flight simulator of claim 24 wherein signals from the input controls are connected to the control system by slip rings.

31. The flight simulator of claim 24 wherein signals from the input controls are connected to the control system by telemetry.

32. A balanced flight simulator comprising:

a base;

a yaw motor, having a frame, a shaft, and a yaw axis, the frame being fixed to the base;

a platform, connected to the shaft of the yaw motor, being rotatable about the yaw axis;

means for support being attached to the platform;

a pitch boom, having a pitch axis, being rotatably connected to the support means;

a pitch motor, having a frame and a shaft, whereby the shaft drives the pitch boom in a rotating motion about the pitch axis and the frame is attached to the support means;

a swing boom, comprising a first section and a second section which are able to rotate about the pitch axis, having a roll axis which is perpendicular to the pitch axis, being rotatably connected to the pitch boom;

a roll motor, having a frame and a shaft, whereby the shaft drives the swing boom in a rotating motion about the roll axis and the frame is attached to the pitch boom;

a counterweight being slidably connected to move along the second section of the swing boom;

a cockpit assembly, having input controls, display devices, and a center of gravity, being supported by the first section of the swing boom; and a control system, operating under the direction of a flight algorithm, being adapted to drive motors which adjust the orientation of the cockpit assembly;

whereby the cockpit assembly's center of gravity is separated from the intersection of the pitch axis and roll axis.

33. The balanced flight simulator of claim 32 wherein the control system drives indicators in the cockpit.

34. The flight simulator of claim 32 wherein the control system drives a screen display in the cockpit.

35. The flight simulator of claim 32 wherein the control system drives a helmet mounted display.

36. The flight simulator of claim 32 wherein the control system records the performance of a person simulating flight conditions in the cockpit.

37. The flight simulator of claim 32 further comprising a counterweight drive assembly, a first portion of which being fixed to the pitch boom and a second portion of which being attached to the counterweight, being adapted to move the counterweight along the second section of the swing boom.

38. The flight simulator of claim 37 wherein the drive assembly further comprises a counterweight motor being adapted to move the second portion of the counterweight drive assembly.

39. The flight simulator of claim 37 further comprising a sensor being coupled to the pitch boom and adapted to detect the rotation of the pitch boom and to generate a signal which is proportional to that rotation.

40. The flight simulator of claim 39 further comprising a balance control system being adapted to receive the signal from the sensor, operate upon it, and direct the counterweight drive motor to statically balance the flight simulator about the pitch axis.

41. The flight simulator of claim 40 wherein the balance control system directs the counterweight drive motor to dynamically balance the flight simulator about the pitch axis.

42. The flight simulator of claim 39 wherein the sensor is optically coupled to the pitch boom.

43. The flight simulator of claim 39 wherein the sensor is mechanically coupled to the pitch boom.

44. A motion simulator comprising:

means for support;

a pitch boom, having a pitch axis, the pitch boom being rotatably connected to the support means;

a swing boom, having a first end and a second end, said swing boom extending along a roll axis in between said first end and said second end that is perpendicular to said pitch axis, wherein said swing boom is rotatably connected to said pitch boom in a manner that enables said swing boom to completely rotate about said pitch boom in a plane perpendicular to said pitch axis;

a cockpit assembly, having a center of gravity, coupled to said first end of said swing boom; and a lift mechanism for selectively raising and lowering said pitch boom;

whereby the cockpit assembly's center of gravity is separated from said pitch axis.

45. The simulator of claim 44, wherein the lift mechanism is hydraulically driven.

* * * * *